3,207,705
RADIATION SHIELDING COMPOSITION COMPRISING CARBON AND LEAD DISPERSED IN CEMENT
William C. Hall, Central Valley, N.Y., assignor to Chemtree Corporation, Central Valley, N.Y., a corporation of Delaware
No Drawing. Filed Apr. 19, 1962, Ser. No. 193,035
5 Claims. (Cl. 252—478)

In prior application Serial No. 166,458, filed January 11, 1962, for Radiation Shielding, there is disclosed an improved radiation shielding material and the present application is a continuation-in-part of that application.

This invention relates to improvements in radiation shielding material.

Radiation shielding problems arise in connection with protection against nuclear explosions and fall-out, in connection with the operation of industrial and research equipment such, for example, as X-ray machines, cyclotrons or other atomic particle accelerators, radar and other micro wave or electronic equipment, in connection with nuclear reactors and with space radiation, such as cosmic radiation, and these problems may be concerned with electro-magnetic radiation, typically gamma radiation, beta or alpha radiation and also neutrons and other atomic particles. While attention in any given application may be directed primarily to some particular type of radiation, the characteristics of the shielding material when subjected to other radiation may also be important, as, for example, in reactor shielding where neutron and gamma ray absorption are both major considerations and the thermal properties of the material may also be involved in a major way.

The present invention is directed to a new composition of a superior shielding efficiency in the gamma radiation range from about 0.5 m.e.v. to 1.5 m.e.v. or the range including gamma radiation from the Cs-137 and Co-60 isotopes. The hitherto generally accepted theory as to radiation absorption in this range, and which involves primarily Compton scattering as opposed to photoelectric absorption or pair production, has been that the mass absorption coefficient is a function of the elements present and their proportions and is not materially affected by conditions of intermixture or chemical combination beyond differences in buildup factor according to the relative order or position of discrete masses of different shielding materials.

It has been found that a composition consisting of carbon particles dispersed through a supporting medium possesses improved radiation absorption properties and this effect may be taken advantage of by selecting suitable cement or other binding material and aggregate or filler material to produce markedly improved radiation shielding compositions.

A typical low density composition according to the present invention may consist (volumetric measure) of three parts wood charcoal (14 mesh screen) to two parts fine masonry sand and four parts Portland cement. The materials are mixed thoroughly with water and poured and set in the usual manner for concrete.

As with ordinary concrete, the water is used to obtain the desired consistency for pouring and it is found that up to about twice as much water as usual may be required in view of the water absorption capacity of the charcoal (two to three parts water, total, in the above mix). The density of the material is substantially 1.6 gms./cm.$^3$ and markedly lower than that of standard concrete. Other forms of carbon such as graphite and coal may be used instead of some or all of the charcoal with corresponding change in water absorption.

Low density carbon-concrete of the above composition, differing from standard concrete principally in the substitution for part of the mineral aggregate of carbon and water, both comparatively low Z materials, was found to have, on comparative tests against standard concrete, a mass absorption coefficient of .083 as compared with .070 for the standard concrete for Cs-137 (.661 m.e.v.) gamma radiation. Specimens of the carbon-concrete in thicknesses varying from about 2.5–15.0 centimeters in increments of 2.5 centimeters were tested against a standard slab of 6.66 centimeters thickness and 2.28 density, bracketing the comparison concrete specimen in terms of linear thickness and total absorption ratio ($I/I_0$), specimens somewhat thinner and thicker than the comparison concrete specimen showing mass absorption coefficients of .088 and .079 while specimens of somewhat less and greater absorption ratio showed mass absorption coefficients of .079 and .083. The test conditions were stabilized with reference to lead, copper, water, concrete and heavy concrete, showing values comparable to the handbook values. Even with reference to the heavy concrete, an advantage in mass absorption coefficient was observed, by approximately six percent.

Similar comparative measurements made with Co-60 (1.17–1.131 m.e.v.) as the radiation source were conducted and the low density carbon-concrete of the invention was found to have a mass absorption coefficient of .062 as compared to .055 for standard concrete, indicating again an advantage of the order of 17–18 percent in terms of mass absorption coefficient. Again, the test specimens bracketed the standard concrete specimen both in linear thickness and absorption ratio.

By contrast with ordinary concrete, the carbon-concrete of the invention has very superior neutron shielding properties, as would be expected from the high proportion of low atomic number H, O and C atoms contained in the composition. Its gamma ray absorption characteristics adapt it to substitution for composite shielding (e.g., polyethylene-lead shielding) now in use in some applications. It has the marked advantage of low cost and of being poured in the desired structure without the presence of joints, holes for fastening members, etc., which impair the efficiency of composite shielding.

The carbon-concrete of the invention shows an advantage over both standard concrete and heavy concrete in absorption of low neutrons (.5 e.v. and 1.0 e.v.), giving fifty percent attenuation in a mass thickness of three grams per centimeter squared as compared to substantially double the mass thickness for corresponding attenuation with the other material or less than thirty percent attenuation in the same mass thickness for those other materials.

In the ordinary fall-out shelter structure, which is typically located largely or entirely below ground level, the major shielding problem involves the roof and upper walls which are subjected to heavy scatter radiation (at correspondingly reduced m.e.v.) from the initial explosion at distances outside the blast area, to fall-out on the surface of the roof or any covering soil and to scattered radiation from fall-out on the adjacent ground and buildings. The low density of the carbon-concrete of the invention thus makes it very advantageous for such use, creating a structure of much greater stability as well as greater shielding capacity than equal weight of ordinary concrete.

The increased gamma ray shielding capacity of carbon-concrete by comparison with the additive effect of its component elements appears to be due to its fine, but non-homogeneous, structure, which combines particles of small size compared to the means free path of the gamma radiation from Compton scatterings but of enormous size compared to molecular dimensions, these particles being of low atomic number (6) and containing trapped water, and being interspersed with sand particles of comparatively high atomic number in a matrix containing also elements of comparatively high atomic number. Under these conditions, a cooperative effect is observed in excess of the additive effect of the elements present whether in homogeneous chemical combination or large masses, each of a homogeneous character. No similar cooperative effect is observed in ordinary concrete where the atomic number of the elements comprising the aggregate particles (e.g., $SiO_2$) and cement matrix (calcium-aluminum silicate of various proportions) are comparable.

With respect to thermal radiation, it is apparent that the material of the invention is superior to the usual concrete. While Portland cement and sand aggregate have been specified as the preferred materials other than the carbon for forming the composition of the invention, other binding materials and aggregates may be used, such, for example, as asbestos, magnesium chloride, iron oxides, plaster of Paris and in general such materials as are suited to the particular application for which the composition is intended and contain elements of comparably high atomic number by comparison with carbon. Carbon in other cheap, commercially available forms, such as anthracite or bituminous coal, may, as mentioned, be substituted for the wood charcoal wherever economic factors or the engineering factors of the material make this desirable.

For gamma radiation shielding applications where low bulk is a desideratum and weight and expense are of secondary importance, as in the case of reactor shielding as well as in other applications, the low density carbon-concrete above described may be modified by substituting for part or all of the sand aggregate, higher Z materials, such, for example, as lead. In such applications, the shielding efficiency is most conveniently stated in terms of linear dimension in the path of a narrow or collimated beam.

A modified carbon-concrete mixed from three parts Portland cement, three parts charcoal and four parts No. 12 lead shot (all measurements volumetric) with required water and having a density of 5.02 grams centimeter (as compared with 7.22 grams per cubic centimeter for lead) showed in the thickness of two inches (50.8 millimeters) an attenuation equivalent to that of 26.67 millimeters of lead, for the radiation from Cs-137 (.67 m.e.v.). The lead in the carbon concrete mixture amounting to less than forty percent by volume in the specimen tested, it is apparent that a marked cooperative effect was obtained, in which the shielding effect for the cement, charcoal and water in the mixture (or increased efficiency of the lead in the form and combination in which used) produce a marked increase in shielding efficiency beyond what would be expected in accordance with theory.

The same specimen when tested against radiation from Co-60 (average about 1.25 m.e.v.) was found equivalent to thirty millimeters of lead, indicating again an increased shielding efficiency beyond what would be expected from the materials taken separately or combined in chemical combination or homogeneous manner.

A second specimen similar to that just discussed differing in containing three parts lead shot instead of four parts by volume showed, in a thickness of 2⅛ inch, a shielding effect equivalent to that of 22.86 millimeters of lead for the Cs-137 radiation and equivalent to 23.25 millimeters of lead for the Co-60, these results being comparable in indicating the cooperative effect above mentioned.

The two specimens above referred to were also tested using Ra-226 (encapsulated in .05 mm. platinum) as a source of radiation, showing, respectively, lead equivalence of 19.55 mm. and 17.78 mm.

Samples of the carbon concrete show superior characteristics on compression failure testing, by comparison with light weight concretes of comparable density and have indicated comparable strength per square inch to standard concrete of much greater densities. The dispersion of the lead particles whether in the form of spherical shot or otherwise in a continuous matrix of a rigid character eliminates the tendency of the lead to creep, thus providing a superior method of incorporating the desired lead in a shielding structure while, at the same time utilizing the volume not occupied by the lead with low Z materials having superior neutron capture characteristics. As pointed out above, the adaptability of the shielding material to construction by pouring into forms and thus eliminating gaps and other openings is of marked advantage.

The size of the lead particles may be reduced below that indicated, the carbon concrete with lead aggregate in the form of granules or powder (200 mesh) showing improved shielding efficiency.

Under thermal conditions unsuited to concrete, as, for example, hot pipe shielding, the composition utilizing asbestos with magnesite binder is found of advantage. A typical composition is composed (dry volumetric measure) of two parts comminuted lead, four parts comminuted charcoal, two parts magnesium oxide and four parts asbestos fibers (⅛ inch maximum length), thoroughly mixed together. This dry mixture is mixed with liquid consisting of four parts by volume of water to one part by volume magnesium chloride, forming a mass which sets to a strong composition in which the materials are evenly dispersed.

A second asbestos formulation consisting of equal parts lead, charcoal and asbestos mixed with water and magnesium chloride liquid in the stated strength, was also found to produce a product of satisfactory mechanical property.

What is claimed is:
1. A radiation shielding composition consisting of from 25–50% comminuted carbon by gross volume, from 25–50% comminuted lead by gross volume, and cement to form a solid structure, the carbon and lead being dispersed evenly throughout the cement.

2. A radiation shielding composition consisting of comminuted carbon and lead evenly dispersed through a concrete supporting medium, the lead comprising from substantially half to two thirds of the total, and the carbon about one-tenth the total by weight.

3. Radiation shielding composition comprising from 20–50% comminuted carbon by gross volume, cement in proportion to form a solid structure, and aggregate from 25–50% by gross volume of the total, selected from the class consisting of sand, asbestos, lead, magnesium chloride and magnesium oxide, the carbon and aggregate being evenly dispersed throughout.

4. Radiation shielding composition comprising comminuted lead, charcoal, and asbestos fibers, together with magnesium oxide, moistened and set with water containing magnesium chloride in a volumetric proportion of about 1:4.

5. Radiation shielding composition consisting essentially of comminuted lead, charcoal and asbestos and a binding agent.

References Cited by the Examiner

UNITED STATES PATENTS

| | | | |
|---|---|---|---|
| 2,726,339 | 12/55 | Borst | 252—478 |
| 2,987,488 | 6/61 | Clark | 252—478 |

FOREIGN PATENTS

| | | |
|---|---|---|
| 755,242 | 8/56 | Great Britain. |
| 878,465 | 9/61 | Great Britain. |
| 569,399 | 11/57 | Italy. |

OTHER REFERENCES

German printed application 1,037,608, August 28, 1958.

CARL D. QUARFORTH, *Primary Examiner.*

REUBEN EPSTEIN, OSCAR R. VERTIZ, *Examiners.*